Dec. 4, 1945.   G. O. LANGENBERG   2,390,376
CUTTING MACHINE
Filed Aug. 3, 1944    2 Sheets-Sheet 2
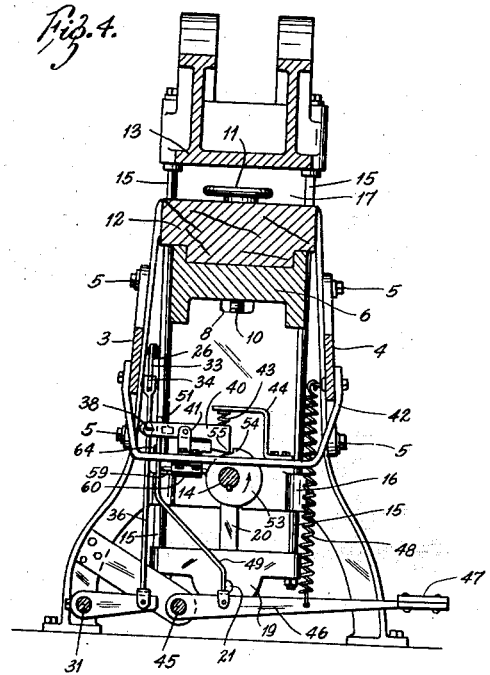
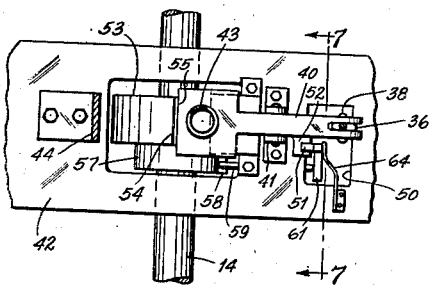
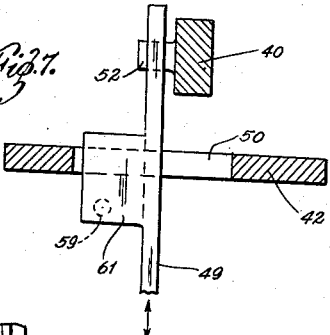
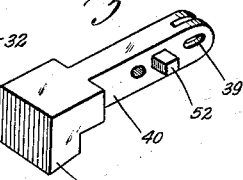
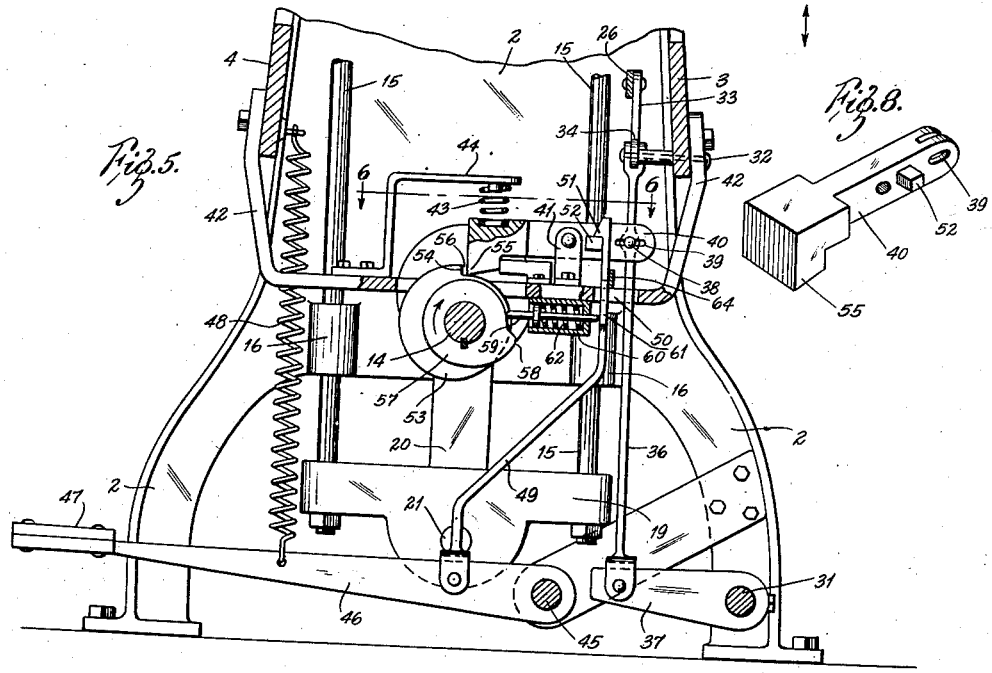
INVENTOR:
GEORGE O. LANGENBERG,
BY John D. Rippey
HIS ATTORNEY.

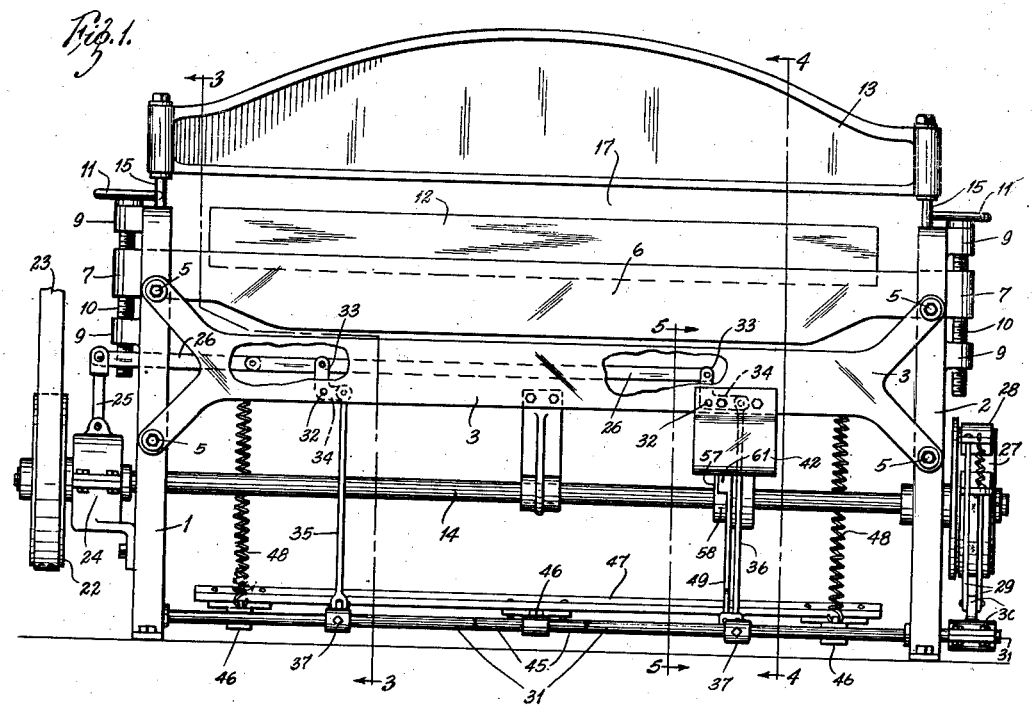
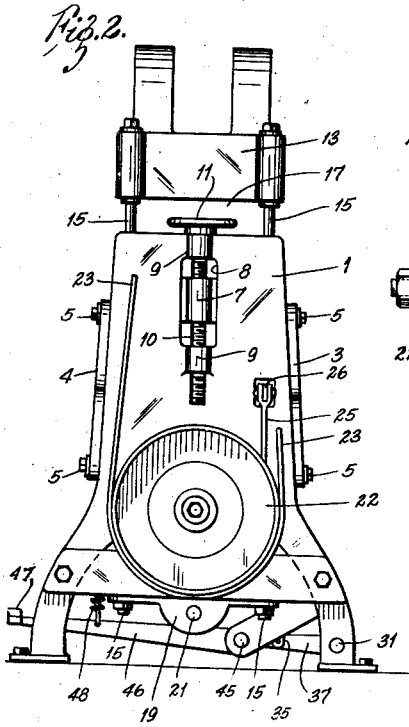
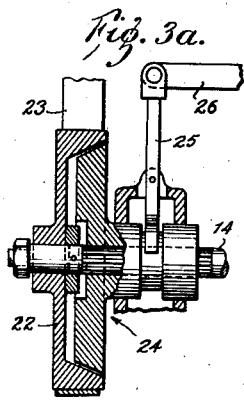
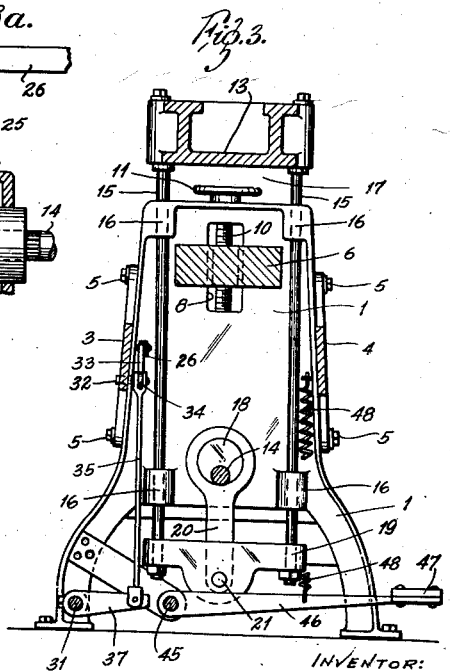

Patented Dec. 4, 1945

2,390,376

UNITED STATES PATENT OFFICE 2,390,376

CUTTING MACHINE

George O. Langenberg, Ballwin, Mo., assignor of one-half to Elmer D. English, Clayton, Mo.

Application August 3, 1944, Serial No. 547,838

11 Claims. (Cl. 164—23)

This invention relates to cutting machines; and it has special reference to mechanism for positively preventing the machine from "repeating"; that is, positively preventing the machine from performing another unintended operation, or a series of unintended operations, after one operation of the machine has been initiated by the operator.

The machine in which the invention is embodied comprises a die block or table upon which the work or material to be cut is placed and supported preparatory for and during cutting operations. Cutting dies of selected forms and shapes are operated by a head beam operatively supported above the die block or table and separated therefrom by a horizontal space in which the work or material to be cut and the cutting dies are properly located and placed upon said die block or table. An intermittently rotative shaft is supported below the die block or table and operates eccentrics for actuating the head beam to drive the dies into and through the work or material on the die block or table, which supports the cutting dies in said space. The said shaft is rotated intermittently through one complete revolution only, by driving mechanism operatively connected with said shaft by devices optionally actuated by the operator, and automatically disconnected from said shaft at the end of each complete revolution thereof. That is, the operating mechanism is disconnected from said shaft at or about the time that said shaft completes revolution. It is important that said shaft be stopped at the end of each complete revolution in order to afford the operator opportunity and time to replace the work or material and the cutting dies for another operation of the head beam. It sometimes occurs that the driving mechanism is not operatively disconnected from said shaft at the end of each revolution of said shaft. This results in "repeating" operations of the machine—that is, in more than one operation effected by more than one complete revolution of said shaft, more than one successive operation of said head beam, and more than one operation of the cutting dies by the head beam. This causes accidents, sometimes seriously injuring the hands of the operator extended into said space for the purpose of relocating the work and the dies properly for another operation of said head beam by said shaft. In many instances, these injuries to the operator are serious.

Objects of the present invention are to provide mechanism for preventing these "repeating" operations and thereby avoiding liability of accidents and injuries to the operator; to provide means for positively disconnecting the driving mechanism from the intermittently rotative shaft and for positively preventing accidental rotation of the shaft as required to operate the head beam; to provide an abutment for positively stopping said shaft at the end of each complete revolution regardless of any tendency to "repeat"; to provide connections movable by the operator for displacing said abutment to permit rotation of said shaft, and simultaneously connecting said driving mechanism with said shaft to rotate the latter through another complete revolution and thereby operate said head block and cutting dies; to provide means for automatically disabling and disconnecting said connections from said abutment during rotation of said shaft and regardless of the tendency of the driving mechanism to perform a "repeating" operation of said shaft; and, generally, to equip the machine with safety appliances for the prevention of accidents and injuries to the operator.

Another object of the invention is to provide a cutting machine having an intermittently rotative driving shaft, a constantly rotating pulley supported on or in axial alinement with said pulley, a device keyed to and movable from a stationary position on said shaft toward and into engagement wiht said pulley whereby said pulley will rotate said shaft, and then movable along said shaft to a position out of engagement with said pulley to leave said pulley in rotation while said shaft remains stationary, lever mechanism for optional operation by the operator to move said device into engagement with said pulley, and means for operating said lever mechanism to move said device out of engagement with said pulley, in combination with means for positively stopping rotation of said shaft by said pulley or otherwise at the end of each complete revolution of said shaft, and means for preventing another or a "repeating" operation of said shaft by said pulley until said lever mechanism has been returned to its initial starting position and has again been actuated by the operator.

Another object of the invention is to provide a cutting machine having an intermittently rotative shaft, and optionally operative devices for rotating said shaft intermittently, in combination with lever connections for operating said devices optionally, and means for intermittently coupling said connections with and uncoupling the same from said devices as an incident to their optional operation to control effective intermittent rotation of said shaft and to stop rotation of said shaft positively at the end of each complete revolution.

Other objects will be made evident by the following description, reference being made to the annexed drawings, in which—

Fig. 1 is a rear side elevation of a machine embodying my present invention, parts being broken away and removed to disclose other parts of said machine.

Fig. 2 is an end elevation of the machine showing the constantly rotating driving pulley in axial alinement with the driving shaft.

Fig. 3 is a vertical sectional view on the line 3—3 of Fig. 1 looking in the direction of the arrows, showing parts of the devices for controlling intermittent rotation of the driving shaft.

Fig. 3a is a sectional view of a clutch device for imparting intermittent rotary movements to the shaft that operates the head beam by the constantly rotating pulley.

Fig. 4 is a vertical sectional view on the line 4—4 of Fig. 1 looking in the direction indicated by the arrows, showing the devices for positively stopping rotation of the driving shaft at the end of each complete revolution.

Fig. 5 is an enlarged sectional view on the line 5—5 of Fig. 4 looking in the direction indicated by the arrows on said line, which is the opposite direction from the direction indicated by the arrows on the sectional line of Fig. 4.

Fig. 6 is a sectional view looking downwardly on the line 6—6 of Fig. 5, showing in plan elevation the devices for positively stopping movement of the driving shaft at the end of each complete revolution.

Fig. 7 is a sectional view on the line 7—7 of Fig. 6 looking toward the left as indicated by the arrows, showing the means for disconnecting the treadle device from the driving control mechanism and from the abutment that positively stops the driving shaft at the end of each complete revolution.

Fig. 8 is a perspective view of the abutment device for positively stopping the driving shaft at the end of each complete revolution, and for operating the member on the driving shaft into engagement with the axially alined constantly rotating driving pulley which imparts intermittent rotation to said driving shaft.

The cutting machine in and with which my present invention is embodied and combined comprises two relatively rigid horizontally spaced complementary frames 1 and 2. The frames 1 and 2 are upright and are rigidly connected together by a rear bar 3 and a front bar 4, attached to said frames by bolts 5. A vertically adjustable die block beam 6 extends horizontally between the frames 1 and 2 and has vertical screwthreaded sockets 7 on its ends extending outwardly through vertically elongated slots 8 in said frames 1 and 2. Vertically spaced bearing bosses 9 are integral with the outer sides of said respective frames 1 and 2 above and below the slots 8 so that said sockets 7 extending through said slots 8 are between said respective pairs of bearing bosses. Die block adjusting screws 10 are rotatively supported in the bearing bosses 9. There is one adjusting screw 10 for each frame 1 and 2. The adjusting screws 10 are screwed through the sockets 7 and thereby support the die block beam 6. A hand wheel 11 is attached to the upper end of each adjusting screw 10 whereby said adjusting screws 10 are prevented from downward longitudinal displacement and may be rotated and caused to move the die block beam 6 vertically to different adjusted positions in the machine. A die block or table 12 of wood, fibrous or plastic material, or the like, is mounted on the upper side of the die block beam 6 to support the work or material that is to be cut by the cutting dies.

A head beam 13 is supported above for movement toward and from the die block or table 12 by operation of the driving shaft 14. Said driving shaft 14 extends horizontally below the die block beam 6 and is rotatively supported by the frames 1 and 2. Each end of the head beam 13 is attached to and supported by a pair of vertical rods 15 mounted for vertical sliding movements in bearings 16 rigid with the frames 1 and 2. Vertical sliding movements of said rods 15 will move the head beam 13 downwardly toward and upwardly from the die block or table 12. In the upper positions of the rods 15, the head beam 13 is separated from the die block or table 12 by a space 17 which is unobstructed both at the front and the rear and is large enough to receive the hands of the operator in placing the work or material upon the die block or table and in locating the dies in proper position on said work or material.

An eccentric 18 (Fig. 3) is attached to the shaft 14 for rotation thereby adjacent to each of the frames 1 and 2. A cross-head 19 is attached to the lower end of each pair of rods 15 below the lower bearings 16 and below the shaft 14. An eccentric arm or pitman rod 20 is operatively engaged with each eccentric 18 and has its lower end connected with the adjacent crosshead 19 by a pivot pin 21. It is evident that, when the shaft 14 is rotated, it will rotate the eccentrics 18, operate the arms or pitman rods 20, move the rods 15 vertically in their bearings 16, and thereby move the head beam 13 downwardly toward and upwardly from the die block or table 12. It is also evident that a downward and upward movement of the head beam 13 will occur during each complete revolution of the shaft 14. The normal or idle or unoperated position of the shaft 14 is that in which the high points of the eccentrics 18 extend upwardly to support the head beam 13 in its uppermost position, leaving the space 17 open and unobstructed so that the operator may place his hands in said space to locate the work or material to be cut and the cutting dies. It is evident that any considerable or nearly complete downward movement of the head beam 13 during the time that the hands of the operator are over the top or top edge of a die in the space 17 will crush or cut the hands and severely injure the operator.

A constantly running pulley 22 is supported on or in axial alinement with the shaft 14. Said pulley is constantly rotated by a driven belt 23. A shiftable device 24 of known clutch construction is keyed on the shaft 14 for sliding movements into engagement with the constantly running pulley 22 in order to rotate the shaft 14 and for sliding movement out of engagement with said pulley to leave the shaft 14 stationary while the pulley continues to rotate. Any suitable known type of clutch may be used for this purpose. A lever 25 has its lower end connected with the shiftable device 24 and its upper end pivoted to a link 26 movable longitudinally in one direction to operate the lever 25 and thereby shift the device 24 into engagement with the rotating pulley 22 to rotate the shaft 14; and movable longitudinally in the opposite direction to shift said device 24 out of engagement with said pulley 22, leaving the pulley 22 in rotation while the shaft 14 stops and remains stationary.

A brake wheel 27 is attached to the opposite end of the shaft 14 from the pulley 22 and is encircled by a brake shoe 28. Links 29 are operatively connected with the ends of the brake shoe 28 and are operative to grip, that is to set, said brake shoe on and release the same from braking engagement with the wheel 27. The lower ends of the rods 29 have operative connection 30 (Fig. 1) with a shaft 31 supported for rocking movements by the lower rear portions of the frames 1 and 2. In its initial or starting position, the shaft 31 holds the brake band 28 gripped or set upon the brake wheel 27. When the shaft 31 is turned in a clockwise direction (Figs. 3 and 4), which is in a counter-clockwise direction as shown in Figs. 2 and 5, the connections 30 operate the rods 29 to release the brake band 28 from braking engagement with the brake wheel 27, leaving the shaft 14 freely rotative without restraint by the brake. When the shaft 31 is turned in a counter-clockwise direction to its initial or starting position as shown in Figs. 3 and 4, or in a clockwise direction as shown in Figs. 2 and 5, the rods 29 are operated to grip or set the brake band 28 on the brake wheel 27 and threby stop rotation of the shaft 14. On some occasions, as during a suddenly arising looseness at the brake connection, it occurs that the shaft 31 is not returned to its initial or starting position and does not grip or set the brake to prevent rotation of the shaft 14; or that the brake mechanism does not function properly to prevent said rotation of said shaft 14. When the shaft 14 is not stopped at the end of each complete revolution, the eccentrics 18 on said shaft and the mechanism operated by said eccentrics 18 cause a "repeat" operation of the head beam 13. This "repeat" operation is dangerous and has often resulted in serious injuries when the hands of operators are extended into the space 17 for the purpose of manually adjusting the work or material and the dies for another operation of the head beam of the machine. The use of gripping pliers with long handles to adjust the work or material and place the dies thereon for another operation of the head beam of the machine is unsatisfactory for the reason that "repeat" operations frequently jar the dies to undesired parts of the work or material, with the result that the material is marred. My invention positively stops rotation of the shaft 14 at the end of each complete revolution. It cooperates directly with the brake mechanism and with the actuating link 26 to stop said shaft 14 in event of failure of the device 24 to function properly, or in event of failure of the operator to release the control treadle, as hereinafter explained.

A pair of bell crank levers are mounted on pivots 32 supported by the rear bar 3. Upwardly extended arms 33 of said bell crank levers are pivotally connected to and support the link 26 for longitudinal movements as required to operate the lever 25. Horizontal arms 34 of said bell crank levers are pivotally connected with the upper ends of links 35 and 36, the lower ends of which are pivotally connected to the forward ends of levers 37 rigidly attached to the rock shaft 31. By these connections, the shaft 31 is rocked in synchronism with longitudinal movement of the link 26, and vice versa. It is impossible for the shaft 31 to rock without simultaneous horizontal longitudinal movement of the link 26, if joints at 35 and 36 and the bell crank arms 34 hold properly.

The link 36 supports a pin 38 engaging into a slot 39 in the rear end of a member 40 constituting a combined actuator or operating lever for the link 36 and an abutment for stopping rotation of the shaft 14 at the end of each complete revolution. The member 40 is pivoted on a support 41 attached to a bracket 42 rigidly secured to the bars 3 and 4. The forward end of the member 40 is actuated downwardly by a spring 43 having its lower end engaging said member 40 and its upper end engaging a holder 44. The spring 43 functions to operate the member 40 as required to move the link 36 upwardly and thereby turn the shaft 31 to its initial or starting position and set the brake mechanism 27—28 as above described; and also to move the link 26 as required to shift the device 24 out of engagement with the pulley 22, thus leaving said pulley in rotation while the shaft 14 remains stationary.

A treadle shaft 45 is supported by the lower ends of the frames 1 and 2 for rocking movements. Treadle arms 46 extend forwardly from rigid attachment with said shaft 40 and support a treadle board 47 beyond and adjacent to the front sides of the frames 1 and 2. Springs 48 connect the arms 46 with the front beam 4 and operate to raise the treadle device and thereby turn the treadle shaft 45 to its initial or starting position after each operation. An arm 49 has its lower end pivoted to one of the treadle arms 46, extends upwardly through an opening 50 in the bracket 42 at the side of the member 40 rearwardly beyond the support 41. The upper end of said link 49 is formed with a shoulder 51 arranged to engage and disengage a lug 52 rigid with the member 40. When the shoulder 51 is in engagement with the lug 52, it is evident that downward movement of the treadle board 47 will move the lower end of the member 40 downwardly, thereby actuating the link 36 in a downward direction and turning the shaft 31 in a direction to release the brake band 28 from the brake wheel 27, and will also move the link 26 toward the right (Fig. 1) to engage the device 24 with the constantly rotating pulley 22 as required to rotate the shaft 14 and operate the head beam 13. It is also evident that, when the shoulder 51 is disengaged from the lug 52, the spring 43 can operate the member 40 to raise the link 36 and thereby turn the shaft 31 in a direction to set the brake mechanism 27—28 and also move the link 26 longitudinally toward the left (Fig. 1) in a direction to probably move the device 24 out of engagement with the constantly running pulley 22. This will enable the shaft 14 to be probably stopped at the end of a complete revolution, and will probably prevent the machine from "repeating."

An eccentric cam 53 is attached to the shaft 14 and is provided with a radial shoulder 54 arranged to engage against an abutment 55 on the forward end of the member 40 when necessary to do so to prevent the machine from "repeating"— that is, to stop the shaft 14 at the end of each complete revolution and prevent said shaft from turning more than one complete revolution. In the normal or starting position of the shaft 14, the shoulder 54 is separated from the abutment 55 by a narrow space 56 so that there is no frictional resistance to the operation of the member 40 by the treadle mechanism 46—47, etc. However, when the brake 27—28 fails to function to stop rotation of the shaft 14 by the constantly running pulley 22 at the end of each complete revolution of said shaft, or the device 24 fails to disengage the pulley 22, the abutment 55 will be engaged by the shoulder 54 of the eccentric 53 and positively stop and prevent further "repeat" operation of said shaft 14 while forcing the frictional contact of the clutch members.

The shoulder 51 is disengaged from the lug 52 at or near the end of downward movement of the treadle device 46—47 and very shortly before the end of a complete revolution of the shaft 14. An eccentric cam 57 is attached to said shaft 14 adjacent to the eccentric 53, and has a high point 58. A rod 59 mounted for longitudinal movements in a support 60 has its forward end adjacent to the eccentric cam 57 and its rear end adjacent to a part 61 on the link 49. A spring 62 actuates the rod 59 forwardly toward the eccentric cam 57. The high part 58 on the eccentric cam 57 is arranged to engage against the rod 59 very shortly before and near the end of each complete revolution of the shaft 14. Therefore, just before and near the end of each complete revolution of said shaft 14, the rod 59 will be moved rearwardly far enough to disengage the shoulder 51 from the lug 52, leaving the spring 43 free to hold the abutment 55 against the peripheral surface of the eccentric 53. When the shoulder 54 strikes the abutment 55 very shortly after the end of each complete revolution of the shaft 14, further rotation of said shaft 14 will be positively stopped regardless of any failure of the brake mechanism 27—28 to function and regardless of the position of the device 24. However, when the brake mechanism 27—28 functions properly, and when the device 24 is disengaged from the constantly running pulley 22, the shaft 14 should be stopped by said brake mechanism at the end of each complete revolution of said shaft, leaving a slight space 56 between the shoulder 54 and the abutment 55. When the brake mechanism 27—28, and the driving mechanism 22—24 for the shaft 14, and other parts of the machine, are operating and functioning properly and in proper timed relationship, the shaft 14 is never turned more than one complete revolution; but said shaft 14 is stopped at the end of each complete revolution by action of the brake mechanism 27—28 and by the disengagement of the device 24 from the constantly running pulley. My mechanism presents or creates no resistance by engagement of the shoulder 54 with the abutment 55 when the machine is operating properly as described, for the reason that there should be a space 56 separating said shoulder 54 from said abutment 55 at the end of each complete revolution of the shaft 14. This invention does not increase the power required to drive the pulley 22 and the mechanism operated thereby.

The arm 49 is actuated forwardly by a device 64 in order to reengage the shoulder 51 with the lug 52 when the treadle mechanism 46—47 rises or is returned to its starting position by the springs 48.

In order to operate the machine, the treadle 47 is pressed downwardly in opposition to the power of the springs 48. Downward movement of the treadle 47 moves downwardly the arm 49, thereby moving downwardly the rear end of the member 40 and raising the abutment 55 above the shoulder 54. Downward movement of the rear end of the member 40 also moves downwardly the link 36, thereby turning the shaft 31 and moving the link 35 downwardly in synchronism with the downward movement of said link 36. Said downward movement of the links 35 and 36 simultaneously operates both bell crank levers 33—34 and thereby moves the link 36 in a direction to engage the device 24 with the constantly running pulley 22 at about the same time that said shaft 31, through the connections 29—30, releases the brake shoe 28 from the brake wheel 27. The shaft 14, being released from the brake mechanism 27—28, is rotated one complete revolution and thereby operates the eccentrics 18, the cross-heads 19, and the head beam 13. During each complete revolution of the shaft 14, the head beam 13 is moved downwardly toward and upwardly from the die block or table 12. Said downward movement of the head beam 13 forces any die or dies on the material or work downwardly to cut through said material or work.

Just before the shaft 14 reaches the end of each complete revolution, as aforesaid, the eccentric cam 57—58 moves the rod 59 far enough toward the rear (Fig. 5) to disengage the shoulder 51 from the lug 52. When the shoulder 51 is disengaged from the lug 52, the spring 43 immediately presses the abutment 55 against and into engagement with the eccentric cam 53 in front of the shoulder 54. This movement of the member 40 operates the link 36 to turn the shaft 31 in a direction to set the brake shoe 28 upon and against the brake wheel 27 at about the same time that the device 24 is disengaged from the constantly running pulley 22 by operation of the bell crank levers 33—34, the link 26, and the lever 25 by said links 35 and 36. The shaft 14 cannot again be rotated until the treadle mechanism 46—47 is raised to its initial or starting position by the springs 48, nor until the arm 49 is returned to its initial or starting position, nor until the shoulder 51 is again engaged with the lug 52 on the member 40. These actions occur at each operation of the treadle mechanism 46—47, so that it is impossible for the machine to perform a "repeating" operation and hurt or injure the hands of the operator extending into the space 17. The head beam 13 cannot operate or be operated until and unless the treadle mechanism 46—47 is again operated. Thus, unintended "repeat" operations of the machine are positively prevented.

From the foregoing, it is evident that this invention attains all of its intended objects and purposes of positively preventing "repeat" operations of the head beam 13 by the intermittently rotative shaft 14. Should the brake mechanism 27—28, or the device 24, fail to function properly to stop the shaft 14 at the end of each complete revolution, or should the operating mechanism for the brake 27—28, or the device 24, fail to operate properly, rotation of the shaft 14 will positively be stopped at or near the end of each complete revolution as desired, and unintended dangerous and harmful "repeat" operations thereof and the head beam 13 will be prevented. I am aware that the invention may be varied in the construction and arrangement of the parts, and that the desired result may be attained by other equivalent elements and parts without departure from the nature and principle of the invention as defined by the appended claims.

I claim:

1. In a cutting machine having a device for operating cutting dies, and a rotary shaft supported for intermittent rotary movements of one complete revolution only during each of said movements and having operative connection with said device; a continuously rotating pulley on said shaft, connections movable from a starting position for controlling rotation of said shaft by said pulley, an abutment device for positively preventing more than one complete revolution of said shaft, a treadle controlling said connections and said abutment device to leave said shaft rotative by said pulley, and a spring for moving said abutment device to position to prevent more than one complete revolution of said shaft by said pulley and for moving said connections to said starting position.

2. In a cutting machine having a device for operating cutting dies, and a rotary shaft supported for intermittent rotary movements of one complete revolution only during each of said movements and having operative connection with said device; a continuously rotating pulley on said shaft for imparting said intermittent rotary movements to said shaft, brake mechanism for stopping said rotary movements of said shaft at the end of each complete revolution thereof, connections movable from a starting position for releasing said brake mechanism and for controlling rotation of said shaft by said pulley, an abutment device for positively preventing more than one complete revolution of said shaft, a treadle for moving said abutment device and also moving said connections from said starting position to leave said shaft freely rotative by said pulley, and a spring for moving said abutment device to position to prevent more than one complete revolution of said shaft by said pulley and for moving said connections to said starting position independently of said treadle.

3. In a cutting machine having a device for operating cutting dies, and a rotary shaft supported for intermittent rotary movements of one complete revolution only during each of said movements and having operative connection with said device; mechanism at one end of said shaft for imparting said intermittent rotary movements thereto, brake mechanism in connection with said shaft for stopping rotary movement thereof at the end of each complete revolution, a treadle, an abutment device operated by said treadle, connections operated by said abutment device when said abutment device is operated by said treadle for releasing said brake mechanism and causing said first mechanism to impart said intermittent rotary movements to said shaft, and a spring for moving said abutment device to a position to prevent more than one complete revolution of said shaft by said first mechanism and to set said brake mechanism.

4. In a cutting machine having a device for operating cutting dies, and a rotary shaft supported for intermittent rotary movements of one complete revolution only during each of said movements and having operative connection with said device; a continuously rotating pulley on said shaft, connections movable from a starting position for controlling rotation of said shaft by said pulley, a treadle, a coupling device operated directly by said treadle and engaging said connections for actuating and moving said connections from said starting position to rotate said shaft by said pulley as aforesaid, and means for disengaging said coupling device from said connections during each of said intermittent rotary movements of said shaft.

5. In a cutting machine having a device for operating cutting dies, and a rotary shaft supported for intermittent rotary movements of one complete revolution only during each of said movements and having operative connection with said device; a continuously rotating pulley on said shaft, connections movable from a starting position for controlling rotation of said shaft by said pulley, a treadle, a coupling device operated directly by said treadle and engaging said connections for actuating and moving said connections from said starting position to rotate said shaft by said pulley as aforesaid, means operated by said shaft for disengaging said coupling device from said connections during each of said intermittent rotary movements of said shaft, and an abutment device for positively preventing more than one complete revolution of said shaft at each intermittent rotary movement thereof by said pulley.

6. In a cutting machine having a device for operating cutting dies, and a rotary shaft supported for intermittent rotary movements of one complete revolution only during each of said movements and having operative connection with said device; a continuously rotating pulley on said shaft, connections movable from a starting position for controlling rotation of said shaft by said pulley, a treadle, a coupling device operated by said treadle and engaging said connections for moving said connections from said starting position as aforesaid, means for disengaging said coupling device from said connections during each of said intermittent rotary movements of said shaft, an abutment device for positively preventing more than one complete revolution of said shaft at each intermittent rotary movement thereof by said pulley, and a spring for moving said abutment device to position to prevent more than one complete revolution of said shaft by said pulley as aforesaid and for moving said connections to said starting position.

7. In a cutting machine having a rigid die block, a movable head beam having a starting position above and separated from said die block by an intervening space for receiving the work and the dies, and also the hands of the operator adjusting said dies on said work preparatory for downward movement of said head beam, a shaft supported below said die block for intermittent rotary movements of one complete revolution only during each of said movements, and devices operated by said shaft for moving said head beam downwardly toward and upwardly from said die block to operate said dies; a releasable clutch device settable to impart said rotary movements to said shaft, a treadle, elements movable by said treadle from a starting position for directly and positively setting said clutch device to impart said rotary movements to said shaft, brake mechanism for stopping said rotary movements of said shaft at the end of each complete single revolution thereof, a movable member for moving said elements to said starting position and thereby releasing said clutch device and also positively stopping and preventing more than one complete revolution of said shaft when said brake mechanism fails to stop said shaft, and an actuator for moving said member as aforesaid.

8. In a cutting machine having a rigid die block, a movable head beam having a starting position above and separated from said die block by an intervening space for receiving the work and the dies, and also the hands of the operator adjusting said dies on said work preparatory for downward movement of said head beam, a shaft supported below said die block for intermittent rotary movements of one complete revolution only during each of said movements, and devices operated by said shaft for moving said head beam downwardly toward and upwardly from said die block to operate said dies; a constantly rotating pulley, a clutch device on said shaft for engagement with said pulley to impart said rotary movements to said shaft and for disengagement from said pulley to leave said shaft stationary while said pulley continues to rotate, a treadle, elements movable by said treadle from a starting position for engaging said clutch device and said pulley, brake mechanism for stopping said rotary movements of said shaft at the end of each said complete revolution thereof when said clutch device and said pulley are disengaged, a shoulder rigid with said shaft, an abutment movable to a position for engagement by said shoulder and directly and positively stopping rotation of said shaft at the end of each said complete revolution of said shaft, and means for moving said abutment to position for engagement by said shoulder and for operating said elements to disengage said clutch device from said pulley and also to set said brake mechanism to stop said shaft.

9. In a cutting machine having a rigid die block, and a movable head beam having a starting position above and separated from said die block by an intervening space for receiving the work and the dies, and the hands of the operator adjusting said dies on said work preparatory for downward movement of said head beam; a shaft supported below said die block for intermittent rotary movements of one complete revolution only during each of said movements, devices operated by said shaft for moving said head beam downwardly toward and upwardly from said die block to operate said dies during each of said rotary movements of said shaft, a constantly rotating pulley, a clutch device shiftable to a position to rotate said shaft by said pulley and to another position to leave said pulley in rotation while said shaft remains stationary, brake mechanism settable to stop rotary movements of said shaft at the end of each complete revolution thereof, elements movable from a starting position to shift said clutch device to said position to rotate said shaft by said pulley and also to release said brake mechanism and leave said shaft freely rotative, a treadle, separable connections for moving said elements from said starting position by said treadle, devices operable independently of both said head beam and said treadle for moving said elements to said starting position to shift said clutch device to said second position, leaving said pulley in rotation while said shaft is free to stop and for setting said brake mechanism to stop said shaft, an actuator operating independently of both said head beam and said treadle for operating said devices as aforesaid, and a shoulder rigid on said shaft for engagement with said last named devices for positively stopping said shaft at about the end of each complete revolution thereof regardless of the position of said clutch device and regardless of whether said brake mechanism stops said rotary movement of said shaft.

10. In a cutting machine having a device for operating cutting dies, and a rotary shaft supported below said device for intermittent rotary movements of one complete revolution only during each of said movements, and connections operated by said shaft for operating said device; a continuously rotating pulley, means cooperative with said pulley for imparting to said shaft intermittent rotary movements of one complete revolution only, brake mechanism operating in synchronism with said means to release said shaft when said shaft is to be rotated by said pulley and said means and to stop said shaft at about the end of each complete revolution thereof, elements movable from a starting position for effecting cooperative engagement of said means and said pulley to rotate said shaft, a treadle, a connection engaged with said elements and operative by said treadle to move said elements from said starting position as aforesaid, means operated by said shaft for disengaging said connection from said elements, and mechanism operated in synchronism with said means and said brake mechanism and independently of said treadle and said brake mechanism for positively preventing more than one complete revolution of said shaft when said brake mechanism fails to stop said shaft.

11. In a cutting machine having a device for operating cutting dies, and a rotary shaft supported for intermittent rotary movements of one complete revolution only during each of said movements and having operative connection with said device; a continuously rotating pulley, means cooperative with said pulley and said shaft for imparting to said shaft intermittent rotary movements of one complete revolution only, brake mechanism for stopping said shaft and operative in synchronism with said means to release said shaft when said shaft is to be rotated by said pulley and said means and to stop said shaft at about the end of each complete revolution thereof, elements movable from a starting position for operating said means and said brake mechanism in synchronism as aforesaid, a treadle, connections operated by said treadle for moving said elements from said starting position, and means operating independently of said first named device for moving said elements to said starting position and also for positively preventing more than one complete revolution of said shaft.

GEORGE O. LANGENBERG.